United States Patent

Conner

[15] 3,641,894
[45] Feb. 15, 1972

[54] LENS SHADE

[72] Inventor: James M. Conner, Mamaroneck, N.Y.

[73] Assignee: Polaroid Corporation, Cambridge, Mass.

[22] Filed: Aug. 21, 1969

[21] Appl. No.: 852,031

[52] U.S. Cl. .................................... 95/11, 95/39, 95/40, 95/13
[51] Int. Cl. ........................................................ G03b 19/00
[58] Field of Search ................... 95/11, 13, 39, 40; 350/58, 350/59, 60

[56] References Cited

UNITED STATES PATENTS

| 569,328 | 10/1896 | Elliot | 95/39 |
| 1,380,810 | 6/1921 | Kroedel | 95/40 |
| 2,039,737 | 5/1936 | Nagel | 95/40 |
| 2,266,914 | 12/1941 | Skinner | 350/60 |
| 2,466,786 | 4/1949 | Throne | 350/58 X |
| 2,880,658 | 4/1959 | Land et al. | 95/39 X |
| 3,399,011 | 8/1968 | Heiniger | 350/60 |
| 3,447,437 | 6/1969 | Tiffany | 95/13 |

*Primary Examiner*—John M. Horan
*Assistant Examiner*—Thomas A. Mauro
*Attorney*—Brown and Mikulka and Alfred E. Corrigan

[57] ABSTRACT

A folding camera comprising a plurality of housing sections including a lens housing pivotally coupled to each other for movement between folded and extended positions. The lens housing is provided with a shade and a linkage system connects the lens shade to the camera so that the lens shade will automatically (1) cover the lens when the camera is in the folded position and (2) move to a position wherein it will shade the lens when the housing sections of the camera are moved to the extended position.

4 Claims, 4 Drawing Figures

INVENTOR.
JAMES M. CONNER
BY Brown and Mikulka
and
Alfred E. Corrigan
ATTORNEYS

LENS SHADE

The present invention is concerned with improvements in photographic apparatus, e.g., folding cameras of the self-developing type adapted to be employed with a film unit including, for example, a photosensitive element, a superposed image-receiving element, and a supply of processing liquid adapted to be distributed between the photosensitive and image-receiving elements. The camera is comprised of a plurality of housing sections including one having a lens for admitting light to the interior of the camera to expose a film unit positioned therewithin and an erecting system coupled to the housing sections for moving and guiding the sections between a compact, folded position and an operative, extended position. In cameras of the foregoing type, one of the housings frequently mounts light-transmitting means, e.g., a lens or a photocell for controlling operation of the shutter. When the camera is in the extended position, the lens is exposed to damage by moisture, dust, fingerprints, and the like. Further, the light entering the lens and which is incident upon the photocell should, whenever possible, be light which has been reflected from the object being photographed and not direct light such as the rays of the sun. Failure to compensate for this direct light may result in photographs which are overexposed in the case where no exposure control is provided and underexposed where the shutter is controlled by a photocell. In view of these problems, it is a primary object of this invention to provide a novel shade for cameras of the foregoing type which will automatically move to a position in which it functions as a protective shade for the lens as the various housing sections of the camera are moved toward the extended position.

Another object of the invention is to provide in a folding camera of the foregoing type, means for automatically moving a lens shade to a position in which it occupies a minimum of space as the various housing sections of the camera are moved to the folded position.

Other objects of the invention will in part be obvious and will in part appear hereinafter.

The invention accordingly comprises the apparatus possessing the construction, combination of elements and the arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
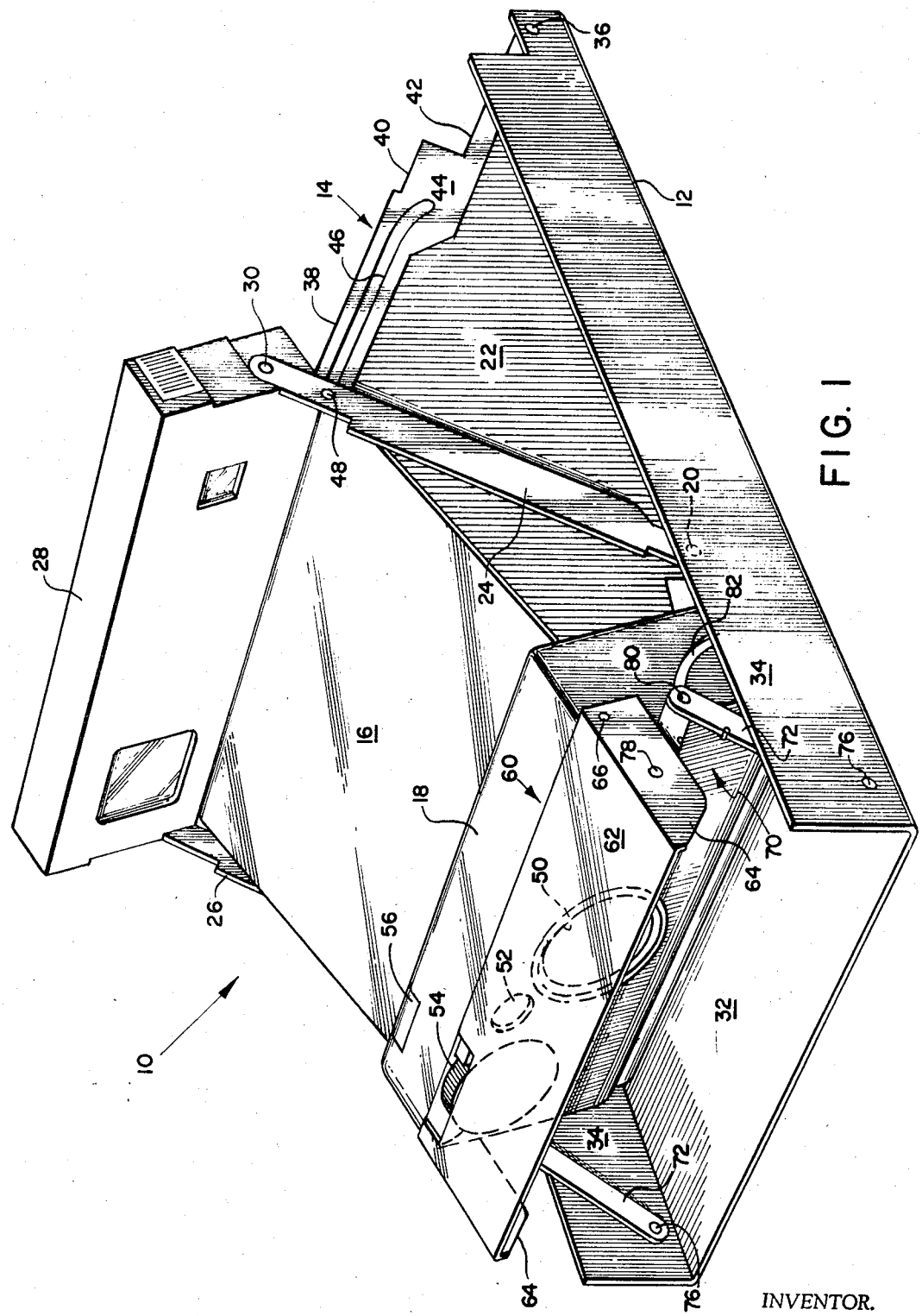
FIG. 1 is a perspective view of a folding camera embodying the instant invention shown in its extended or operative position.

Reference is now made to the drawings wherein is shown photographic apparatus in the form of a folding camera 10 of the self-developing type. Camera 10, shown in FIG. 1 in its extended or operative position, is comprised of a plurality of housing sections 12, 14, 16, and 18, forming four sides of a lighttight exposure chamber, the ends of which are closed by a flexible bellows 22. An erecting system including a pair of links 24, 26, pivotally mounted at 20 to an inner frame number of the camera and a rangefinder-viewfinder 28, pivotally mounted near the ends of the links at pivots 30 (only one of which is shown), is provided for supporting and guiding the housing sections between the folded and extended positions.

Housing section 12 includes a rear wall 32, a portion of which functions as a loading door to gain access to the interior of the camera, and a pair of parallel flanges 34. Housing section 12 includes means for supporting a succession of film units in position for exposure when the camera is in the extended position shown in FIG. 1.

Pivotally coupled to one end of housing section 12 at hinge 36 is one end of housing section 14. Section 14 includes an exterior wall 38 having recessed portions 40 and 42 therein for receiving rangefinder-viewfinder 28 and a pair of sidewalls 44 (only one of which is shown) having grooves 46 therein. A pin 48 located on an intermediate portion of each link 24, 26 extends into each groove 46 for transmitting force from the links to the housing sections as the sections are moved between the folded and extended positions. An interior wall of housing section 14 includes a reflecting surface, e.g., a mirror for directing light from the camera's lens toward the film unit located in position for exposure within housing section 12. The end of section 14 opposite to that pivotally connected to section 12 is pivotally coupled at hinge 15 to housing section 16, which, in turn, has its opposite end pivotally coupled at hinge 17 to housing section 18.

Figure 4:
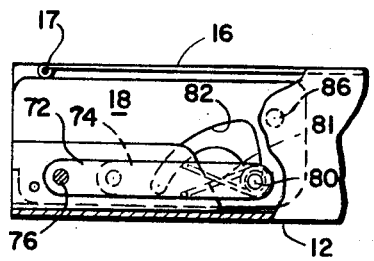
FIG. 4 is a view similar to FIG. 3 showing the lens housing and shade in the folded position.

Housing section 18 includes a lens and shutter 50, a photocell window 52, a focusing control 54, and a shutter release button 56. Housing section 18 is suitably mounted for pivotal movement on the inner frame (not shown) about hinge 86 for movement between the extended position shown in FIGS. 1 and 2 and the folded position shown in FIG. 4.

For other details of the camera, reference is made to the copending applications of Irving Erlichman, U.S. Ser. No. 824,097, filed May 13, 1969, and Irving Erlichman et al. U.S. Ser. No. 764,142, filed Oct. 1, 1968, now U.S. Pat. No. 3,545,357, both applications being assigned to the assignee of the instant application.

In order to protect the lens 50 and photocell 52 from the adverse effects of dirt and direct light, a cover means in the form of a lens shade 60 is provided. Cover means 60 includes a generally horizontal member 62 having a flange 64 at each distal end thereof. A pair of pivot pins 66 (only one of which is shown) pivotally connect the cover means to the lateral ends of the shutter housing 18. Coupling means, generally indicated at 70, are pivotally coupled between each flange of the cover means 60 and the camera for automatically moving the cover means from the position shown in FIGS. 1 and 2, wherein it functions as a lens shade, to the position shown in FIG. 4, wherein it lies between housing sections 12 and 18 as the camera is moved from the extended position to the folded position.

Figure 2:
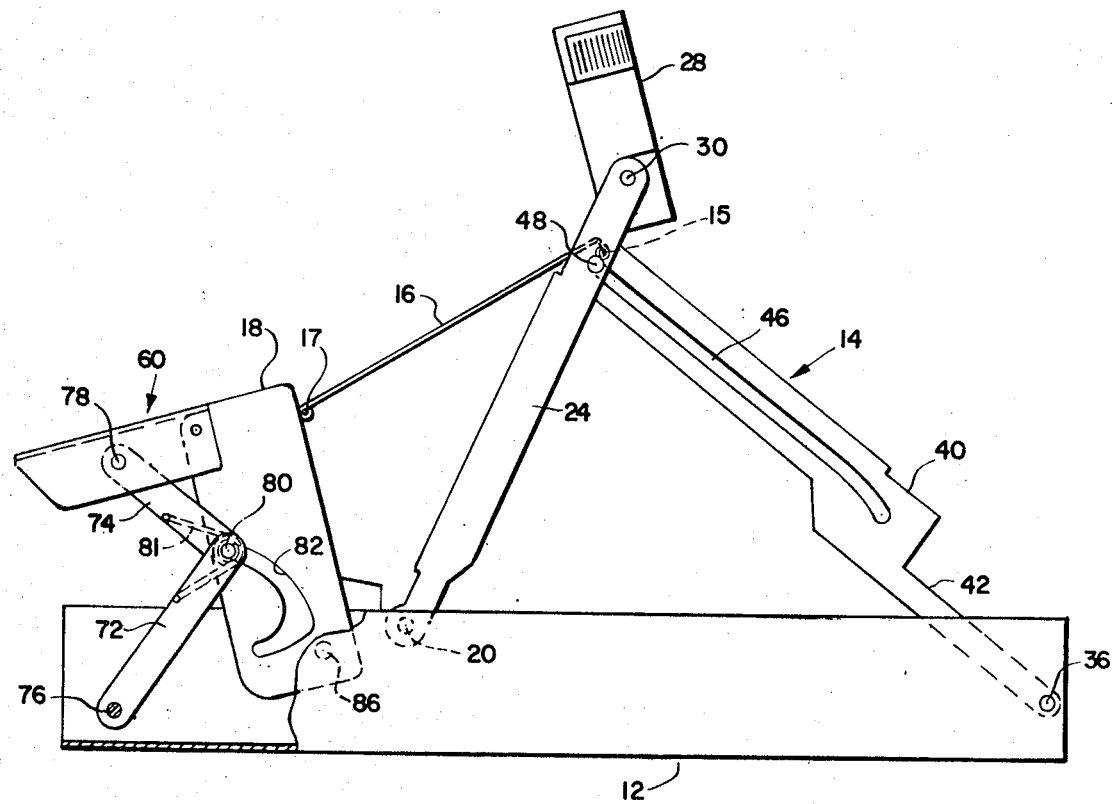
FIG. 2 is a side view, partly in section, of the camera of FIG. 1.
Figure 3:
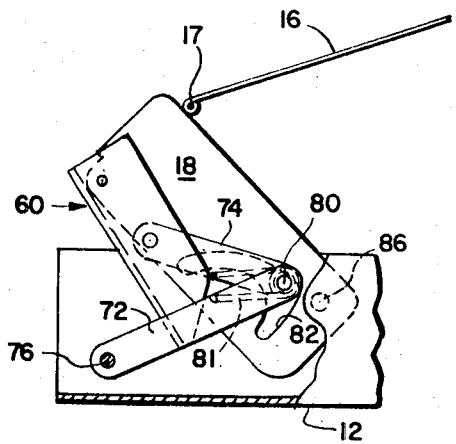
FIG. 3 is a fragmentary view, partly in section, of the lens housing and shade of the camera of FIG. 1 in a position intermediate the full folded and extended positions of the camera.

Coupling means 70 (only one of which will be described because they are identical) includes a pair of links 72 and 74 pivotally coupled to each other by pivot pin 80. The free end of link 72 is pivotally attached to flange 34 by a pin 76 and the free end of link 74 is pivotally attached to flange 64 by pin 78. A spring 81 is positioned about pin 80 and has its ends in engagement with links 72 and 74 (see FIG. 2) for resiliently biasing the links toward the position shown in FIGS. 1 and 2. The ends of pins 80, which face each other, are suitably shaped to be retained in grooves 82 located in each side of shutter housing 18 for guiding the coupling means 70 as it moves between the positions shown in FIGS. 2–4.

When it is desired to move the camera to its folded position, the user grasps the rangefinder-viewfinder 28 and pulls it rearwardly (to the right as viewed in FIG. 1). Movement of rangefinder-viewfinder 28 to the right will cause links 24 and 26 to rotate in a clockwise manner about pivots 20 and housing section 14 to rotate about hinge 36 in a counterclockwise manner due to the force being transmitted thereto by pin 48 riding in groove 46. Counterclockwise movement of section 14 urges housing section 16 to the left and housing section 18 to rotate in a counterclockwise manner about pivot 86. Counterclockwise movement of shutter housing 18 will cause the ends of pivot pins 80, located within grooves 82, to move toward the lower end (as viewed in FIG. 2) of each groove. Because of the geometry of groove 80 and the location of pivot points 76 and 78, cover means 60 rotates in a counterclockwise manner about pivot 66 to quickly assume a position wherein it covers the lens and photocell window of the shutter housing 18 (see FIG. 3). Further movement of the various sections of the camera toward the folded position will eventually result in the camera assuming a parallelepiped configuration with a portion of the cover means, i.e., portion 62, located between housing section 18 and another housing section i.e., section 12. The converse is true, i.e., the camera is erected by grasping rangefinder-viewfinder 28 and moving it in a counterclockwise manner about pivot 20 thereby rotating housing sections 14 and 18 in a clockwise manner. Movement of housing section 18 in this latter manner will cause pin 80 to ride upwardly in the groove and spring 81 will urge the links apart until the lens shade assumes the position shown in FIGS. 1 and 2.

From the foregoing detailed description it can be seen that there has been disclosed a novel and unobvious means of coupling A lens shade to a folding camera such that the former will automatically move from a folded position, in which it covers and protects the camera's lens, to an extended position in which it functions as a shade as the camera moves from a folded position to an operative, extended position, and will automatically move back to its original position when the camera sections are moved back to the folded position.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A folding camera comprising:
   first and second housing sections coupled to each other for movement between a folded, compact position and an extended position;
   light-transmitting means supported by said first housing section;
   cover means pivotally coupled said first housing section for movement between a first position in which said cover means covers said light-transmitting means and is located between said first and second housing sections when said first and second housing sections are in said folded compact position and a second position in which said cover means extends above and forwardly of said light-transmitting means to function as a shade for said light-transmitting means when said first and second housing sections are in said extended position; and
   coupling means connected between said cover means and said first and second housing sections for moving said cover means between said first and second positions as said camera and said first and second housing sections are moved between said folded and extended positions.

2. A folding camera as defined in claim 1 wherein said coupling means includes a pair of links, means pivotally connecting one end of each link to said second housing section and said cover means, and pivot means coupling the other ends of said links to each other and to said first housing section.

3. A folding camera as defined in claim 2 wherein said pivot means includes means engageable with guide means on said first housing section for permitting said pivot means to move in sliding engagement with said first housing section as said housing sections are moved between said folded and extended positions.

4. A folding camera as defined in claim 3 further including biasing means for urging said cover means toward said second position.

* * * * *